(12) United States Patent
Xie et al.

(10) Patent No.: US 6,541,150 B1
(45) Date of Patent: Apr. 1, 2003

(54) SOLID POLYMER ELECTROLYTE FUEL CELL

(75) Inventors: Gang Xie, Aichi-ken (JP); Harumi Hashiguchi, Aichi-ken (JP); Norio Nakaya, Aichi-ken (JP); Atsushi Tomita, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 83 days.

(21) Appl. No.: 09/629,800

(22) Filed: Jul. 31, 2000

(30) Foreign Application Priority Data

Jul. 30, 1999 (JP) .......................................... 11-218048

(51) Int. Cl.[7] .......................... H01M 4/86; H01M 8/10; H01M 4/88
(52) U.S. Cl. ............................. 429/40; 429/41; 429/30; 502/101
(58) Field of Search ............................. 429/40, 41, 42, 429/44, 45, 43, 30; 252/182.1; 521/25; 502/101

(56) References Cited

U.S. PATENT DOCUMENTS

| 4,876,115 | A |   | 10/1989 | Raistrick |
| 5,723,173 | A | * | 3/1998  | Fukuoka et al. ............. 427/115 |
| 6,060,187 | A | * | 5/2000  | Uchida et al. ................ 429/30 |

FOREIGN PATENT DOCUMENTS

| JP | 7-296818 | 11/1995 |
| JP | 8-185866 | 7/1996  |

* cited by examiner

Primary Examiner—Stephen Kalafut
Assistant Examiner—R Alejandro
(74) Attorney, Agent, or Firm—Oblon, Spivak, McClelland, Maier & Neustadt, P.C.

(57) ABSTRACT

In order to improve gas permeability and electric conductivity, a solid polymer electrolyte fuel cell is so designed as to include an electrolyte 100 in the boom of an ion exchange membrane, a gas diffusion layer 110/120 arranged on each side of the electrolyte 100, and an electrode catalyst substance, dispersed in the gas diffusion layer 110/120.

14 Claims, 8 Drawing Sheets

*FIG. 2b*
(PRESENT INVENTION)

⬇ WATER-REPELLING TREATMENT

*FIG.5b*

⬇ CATALYST IMPREGNATION

WATER-REPELLING TREATMENT

*FIG. 7c*

CATALYST IMPREGNATION

SOLID POLYMER ELECTROLYTE FUEL CELL

BACKGROUND OF THE INVENTION

1. Field of the Invention

The present invention is directed to a solid polymer electrolyte fuel cell.

2. Discussion of the Background

A variety of fuel cells are effective to cope with global environmental and resource problems such as $CO_2$ discharge regulation for the prevention of atmospheric pollution and the shortage of oil resources. However, the solid polymer electrolyte fuel cell has been spotlighted due to the clean-fashion operation, high density in energy and charging-free characteristics. Thus, in many countries such as Japan, research and development of the solid polymer electrolyte fuel cell is making rapid progress.

Figure 8:
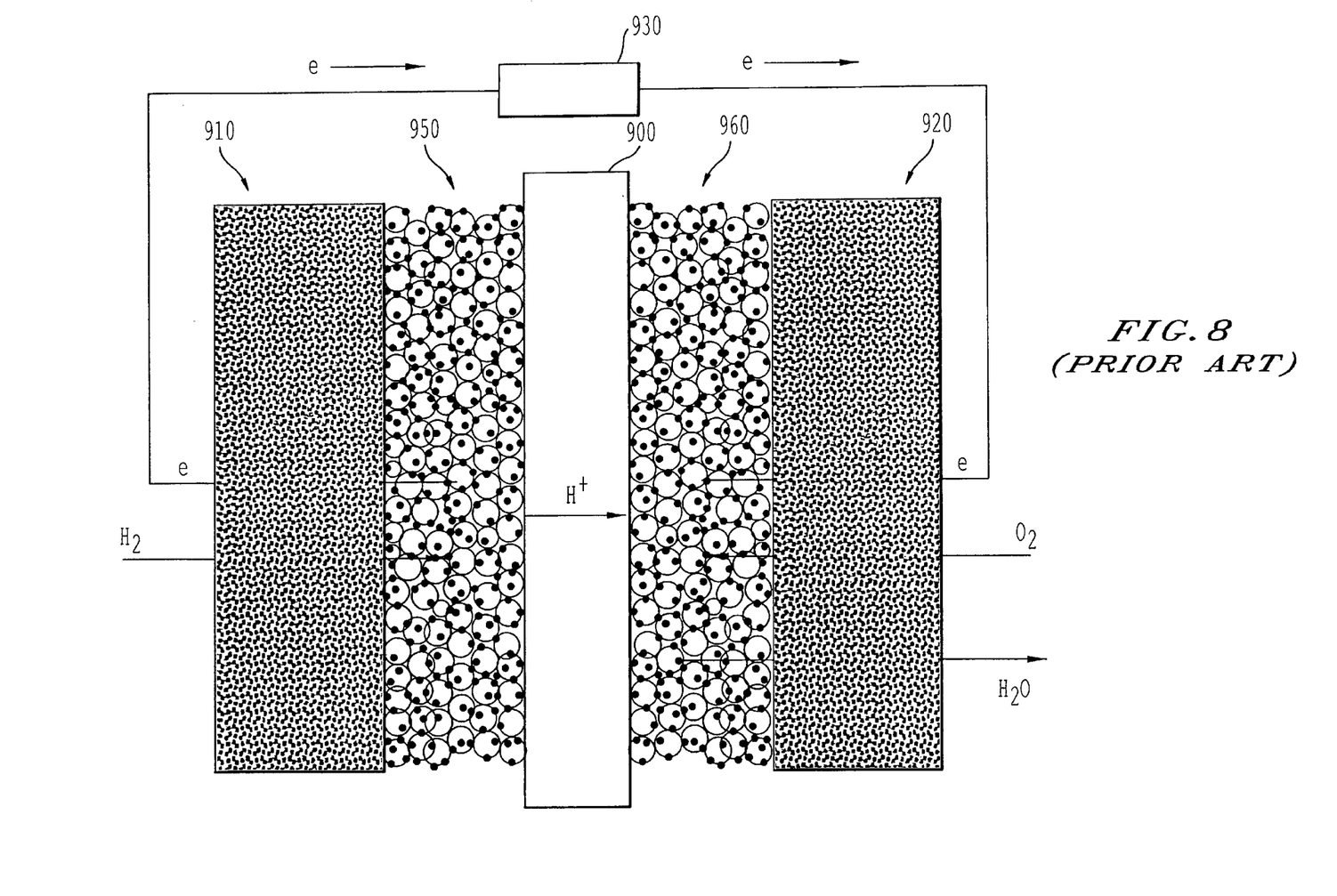
FIG. 8 illustrates a side cross-sectional view of a conventional or prior art solid polymer electrolyte fuel cell.

As illustrated in FIG. 8, in a conventional or prior art solid polymer electrolyte fuel cell two gas-permeable, porous, electrically conducting gas diffusion layers, are provided at both sides of a polymer electrolyte membrane 900. A catalyst layer 950 is interposed between one side of the polymer electrolyte membrane 900 and the gas diffusion layer 910. A catalyst layer 960 is interposed between the other side of the polymer electrolyte membrane 900 and the gas diffusion layer 920. An external circuit 930 as an external load is interconnected between the gas diffusion layers 910 and 920. The gas-permeable, porous, electrically conducting gas diffusion layer 910 and the catalyst layer 950 constitute a fuel electrode, while the gas-permeable, porous, electrically conducting gas diffusion layer 920 and the catalyst layer 960 constitute an oxidant electrode.

In the solid polymer electrolyte fuel cell having the above structure, a fuel gas which is in the form of a hydrogen gas or a hydrogen-containing gas flows through the gas diffusion layer 910 and reaches the catalyst layer 950. Then, the following electrochemical reaction occurs:

$$2H_2 \rightarrow 4H^+ + 4e^-$$

resultant proton H+ moves toward the oxidant electrode by passing through the polymer electrolyte membrane 900. At the oxidant electrode oxygen or air are used as oxidants. Simultaneously, the electron $e^-$ generated at the fuel electrode moves, by way of the external circuit 930, toward the oxidant electrode. The electrical resistance which results from the series connection of the catalyst layer 950 and the gas diffusion layer 910 drops the voltage, thereby lowering the cell output.

At the side of the oxidant electrode the oxidizing gas containing oxygen and the electron $e^-$ which comes from the external electric circuit move through the gas diffusion layer 920 and reach the catalyst layer 960, at which the following electrochemical reaction or reduction occurs:

$$O_2 + 4H^+ + 4e^- \rightarrow 2H_2O$$

Some of the formed water enters the polymer electrolyte membrane 900 and diffuses toward the fuel electrode due to a concentration gradient. The remaining water is evaporated, diffuses into a gas passage (not shown) by way of the catalyst layer 960 and the gas diffusion layer 920. It is then discharged outside together with an off gas of the oxidant gas. The diffusion path of the water depends on the length of the catalyst layer 960 and the gas diffusion layer 920. As the diffusion path of the water becomes longer the produced water becomes difficult to be discharged, in addition to the increase of the electrical resistance and the increase of the reaction gas diffusion resistance. This causes an easy condensation of water, with the result that the supply of reaction gas is disturbed. Thus, the catalyst utilization is lowered, thereby lowering the cell characteristics.

In view of the foregoing circumstances, there is a need for a solid polymer electrolyte fuel cell which is free from the above drawbacks.

SUMMARY OF THE INVENTION

It is an object of the present invention to provide a solid polymer electrolyte fuel cell which overcomes the above drawbacks.

These and other objects are achieved according to the invention, the first embodiment of which includes a solid polymer electrolyte fuel cell, comprising:

a first gas diffusion layer;

a second gas diffusion layer; and a catalyst layer;

wherein said first diffusion layer, said second gas diffusion layer and said catalyst layer are arranged on each side of an electrolyte;

wherein said electrolyte is an ion exchange membrane;

wherein said electrolyte is sandwiched;

wherein said catalyst is dispersed in a cellular dispersion layer which constitutes the gas diffusion layer.

Another embodiment according to the present invention includes a solid polymer electrolyte fuel cell comprising:

an electrolyte;

a gas diffusion layer arranged on each side of the electrolyte; and an electrode catalyst dispersed in a gas diffusion layer, wherein said electrolyte is an ion exchange membrane.

Yet another embodiment according to the present invention includes a gas diffusion layer comprising:

a base flat member having at least one pore;

a catalyst; and at least one catalyst supported particle, wherein said catalyst supported particle is dispersed in said pore of said base flat member.

DETAILED DESCRIPTION OF THE INVENTION

A first aspect of the present invention provides a solid polymer electrolyte fuel cell which comprises:
- an electrolyte in the form of an ion exchange membrane;
- a gas diffusion layer arranged on each side of the electrolyte; and
- electrode catalyst means dispersed in the gas diffusion layer.

In accordance with the first aspect of the present invention, the electrode catalyst means is dispersed in the gas diffusion layer, which makes it possible to integrate the prior art catalyst layer and gas diffusion layer, thereby improving gas permeability and electrical conductivity.

A second aspect of the present invention is to provide a solid polymer electrolyte fuel cell according to the first aspect, wherein the electrode catalyst means is in the form of a powder consisting of numerous particles. One or more electrode catalyst particles are supported on each of the plural supporting members which are distributed throughout the gas diffusion layer.

In accordance with the second aspect of the present invention, the electrode catalyst means is dispersed in the gas diffusion layer, which makes it possible to integrate the prior art catalyst layer and gas diffusion layer, thereby improving gas permeability and electrical conductivity. In particular, the catalyst dispersion is established by distributing supporting members on which the catalyst is supported. This allows for a uniform distribution of the catalyst throughout the gas diffusion layer.

A third aspect of the present invention is to provide a solid polymer electrolyte fuel cell according to the second aspect, wherein the gas diffusion layer includes therein numerous pores. Each of the pores is greater in size than the supporting member, and the dispersion of the electrode catalyst is established by filling one or more supporting members in each of the pores.

In accordance with the third aspect of the present invention, the electrode catalyst means is dispersed in the gas diffusion layer, which makes it possible to integrate the prior art catalyst layer and gas diffusion layer, thereby improving gas permeability and electrical conductivity. In particular, the catalyst dispersion is established by distributing supporting members on which the catalyst is supported in the pores. This allows uniform easy catalyst distribution.

A fourth aspect of the present invention is to provide a solid polymer electrolyte fuel cell according to the third aspect, wherein the supporting member is in the form of an electrically conducting particle.

In accordance with the fourth aspect of the present invention, the catalyst supporting member is formed of an electrically conducting substance. Accordingly, it is possible to improve the electrical conductivity as well as the merits derived from the third aspect.

A fifth aspect of the present invention is to provide a solid polymer electrolyte fuel cell according to the fourth aspect, wherein the electrically conducting particle is any one of a carbon particle and a metallic particle.

In accordance with the fifth aspect of the present invention, commercially available members can be used.

A sixth aspect of the present invention is to provide a solid polymer electrolyte fuel cell according to the fifth aspect, wherein the gas diffusion layer is formed of a carbon fiber material such as a carbon paper or a carbon cloth.

Since the gas diffusion layer consists of a carbon fiber material such as the carbon paper or the carbon cloth, forming the gas diffusion layer becomes easier due to the fact that the carbon paper or the carbon cloth can be obtained very easily.

A seventh aspect of the present invention is to provide a solid polymer electrolyte fuel cell according to the fifth aspect, wherein the gas diffusion layer is formed of any one of a carbon particle sintered member and/or a metal-made member.

In accordance with the seventh aspect of the present invention, the gas diffusion layer is formed of any one of the carbon particle sintered member and a metal-made member. This makes it possible to integrate the prior art catalyst layer and gas diffusion layer, thereby improving gas permeability and electrical conductivity.

Figure 1:
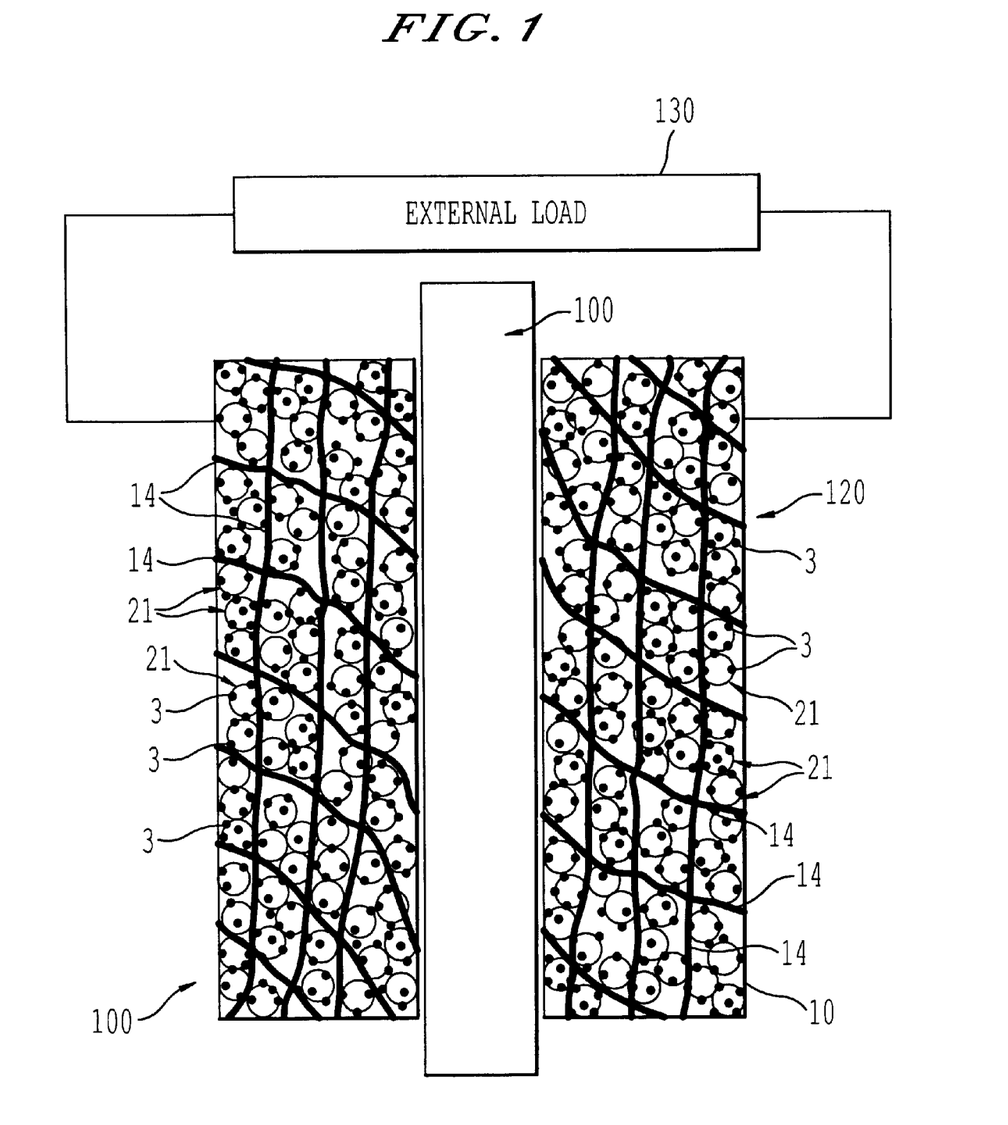
FIG. 1 illustrates a side cross-sectional view of a solid polymer electrolyte fuel cell in accordance the present invention.

In accordance with a first embodiment of the present invention, FIG. 1 illustrates a solid-state polymer electrolyte fuel cell which includes a solid polymer electrolyte (SPE) membrane 100 which is sandwiched between gas diffusion layers 110 and 120. Between the gas diffusion layer 110 and the gas diffusion layer 120, there is interconnected an external circuit or load 130. The gas diffusion layers 110 and 120 have gas diffusion property.

Figure 2A:
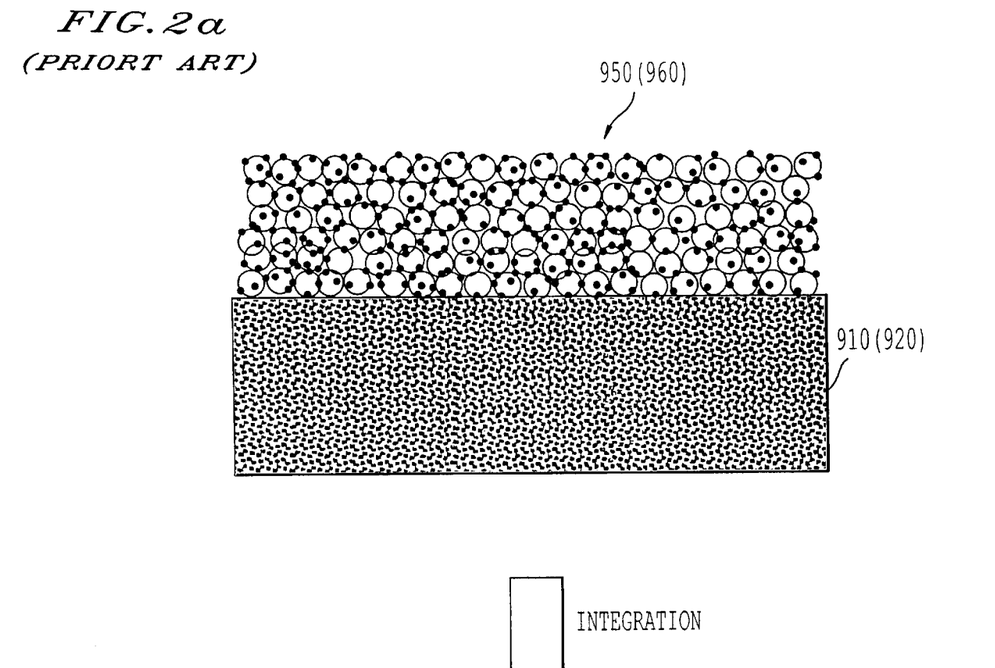
FIG. 2 illustrates a comparison diagram in which a side sectional view of a conventional gas diffusion layer structure and a side sectional view of a gas diffusion layer which is the gist of the present invention are depicted in comparison fashion.
Figure 2B:
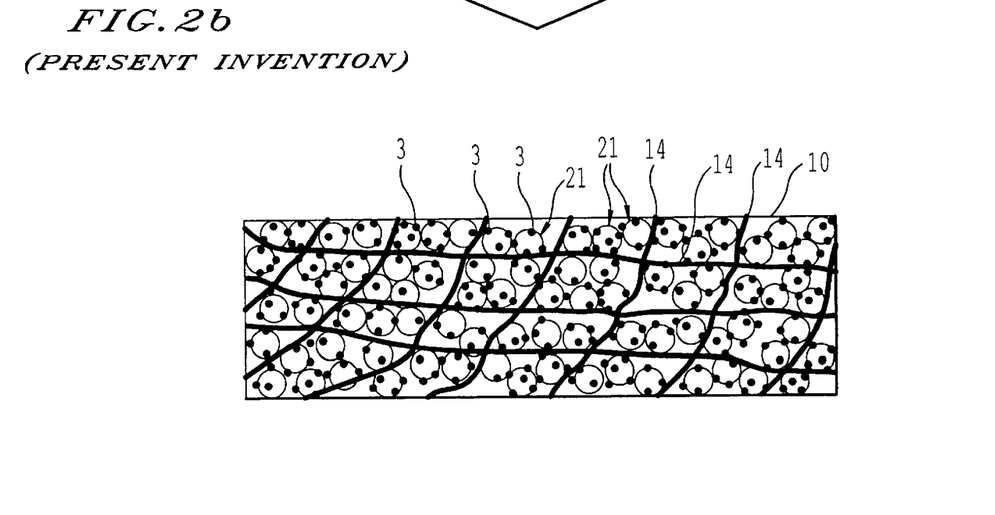

FIG. 2 shows in part (A) a side sectional view of a conventional or prior art gas diffusion layer and in part (B) a side sectional view of a gas diffusion layer according to the invention, which has also been shown in detail in FIG. 1. As can be seen from FIG. 2, each of the gas diffusion layer 110 and the gas diffusion layer 120 is an integration of the catalyst layer into the gas diffusion layer. In detail, the gas diffusion porous electrode 110 includes a carbon paper 11 whose inner structure is interstitial by entangled fibers 14. Namely, the carbon paper constitutes a cellular dispersion layer 10. Carbon particles 21 each of which supports a plurality of powdered catalysts 3 are in the carbon paper having the above inner structure. As the catalyst 3, preferably platinum or a platinum alloy is used. The catalyst can be in the form of a particle or a layer. The carbon particle 21 constitutes a catalyst supporting member 20.

In the carbon paper 11, a plurality of pores or porous inner spaces of different shape and the pore size is larger than any one of the carbon particles 21 supporting the powdered catalysts 3. Preferably, a pore has a diameter which ranges from 10 to 10000 times that of the carbon particle 21. More preferably, the diameter of the pore can be 1–10 times, and even more preferably, greater than 10000 times that of the carbon particle 21. If the diameter of a pore is designed to be greater than 10000 times that of the carbon particle 21, the catalyst utilization can become higher by filling electrically conducting particles having a diameter larger than the diameter of the carbon particle 21 before the carbon particles 21 are dispersed in the carbon paper 11. It is to be noted that the electrically conducting particles can support the catalyst. In this case, the diameter and catalyst supporting amount of the electrically conducting particle may differ from those of the carbon particle 21.

The void ratio or pore roughness and pore diameter are adjusted by the dimensions of the pore and the carbon particle 21. Instead of the carbon particles 21, any electrically conducting metal particles can be employed.

Figure 3A:
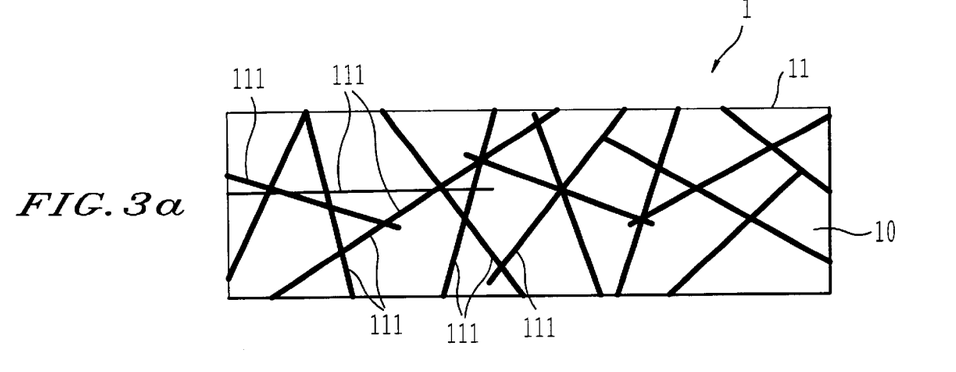
FIG. 3 illustrates, in sequential fashion, how a gas diffusion layer, according to the first embodiment, is made.
Figure 3B:
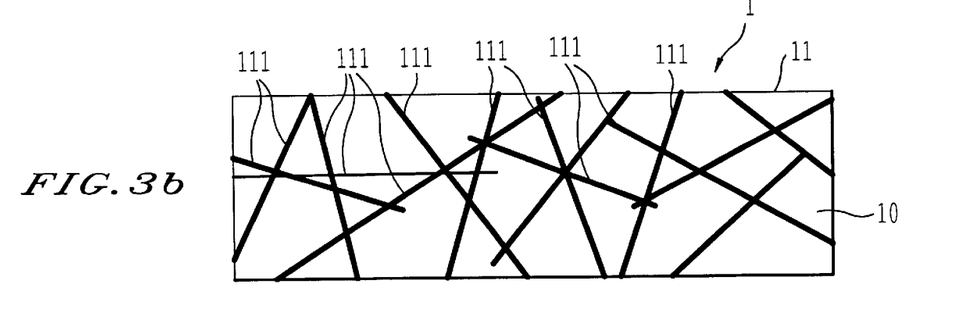
Figure 3C:
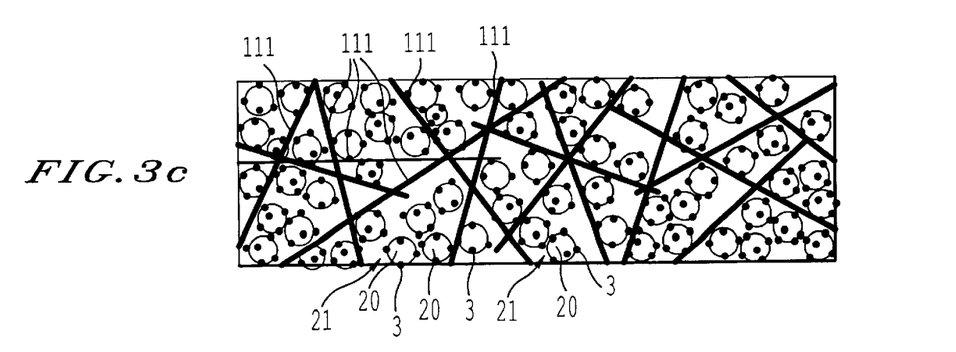

FIG. 3 illustrates how the gas diffusion layer 110 (120) is formed or made. In step (A), the carbon paper 11 is prepared. The carbon fibers 111 are entangle in the carbon paper 11 and are formed into a flat layer. In step (B), a water-repelling treatment is applied entirely to the carbon paper 11. In step (C), the carbon particles 21 supporting the catalysts 3 are impregnated in the pores between the fibers 111 and 111 so as to be dispersed along the three dimensions.

In the foregoing structure, the carbon particles 21 supporting the catalysts 3 are dispersed in the gas diffusion layer 110 (120), which makes it possible to integrate the catalyst supporting carbon particles 21 and the gas diffusion layer 110 (120) or make them coexist. This results in an improvement of the electrical conductivity and gas permeability.

Furthermore, the catalyst supporting carbon particles 21 are dispersed in the pores of the carbon sheet 11 each of which is larger in size than any one of the carbon particles 21. This results in an even or uniform dispersion of the catalysts 3 upon integration of the catalyst supporting carbon particles 21 and the gas diffusion layer 110 (120).

In addition, the catalyst supporting carbon particles 21 are dispersed in the carbon paper 11 which is one of carbon fiber-made substances. The catalyst supporting carbon particles 21 can be dispersed between gaps or pores which are defined between fibers.

The above integration of the catalyst supporting carbon particles 21 and the gas diffusion layer 110 (120) allows to make the gas diffusion electrode thinner, thereby establishing a compact sized fuel cell stack.

Since the catalysts 3 are dispersed in the gas diffusion layer 110 (120), the electrical conductivity, gas permeability, and catalyst utilization are improved. Accordingly, the solid-state polymer electrolyte fuel cell has excellent cell output characteristics.

The catalysts 3 are dispersed in the gas diffusion layer 3 resulting in less overlay of the catalysts and improved catalyst utilization. Accordingly, the required amount of platinum as a raw material of the catalysts 3 is reduced when compared to the conventional structure for obtaining the same output.

Figure 4A:
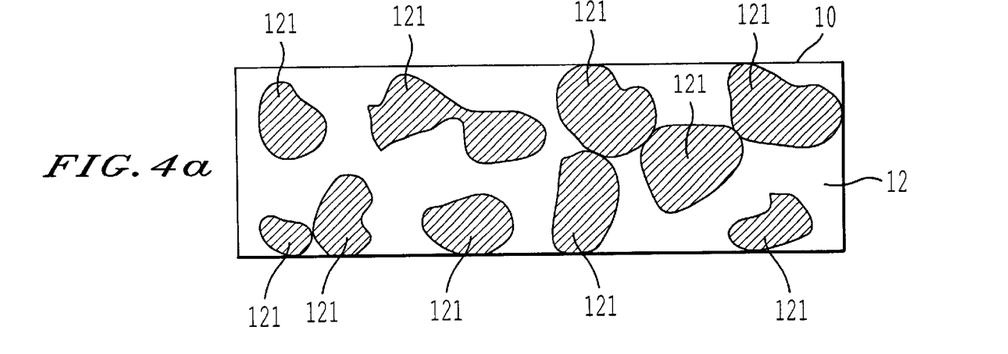
FIG. 4 illustrates, in sequential fashion, how a gas diffusion layer, according to the second embodiment, is made.
Figure 4B:
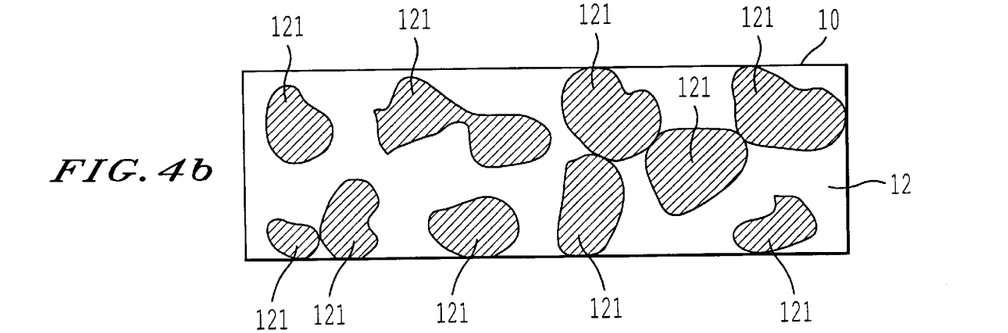
Figure 4C:
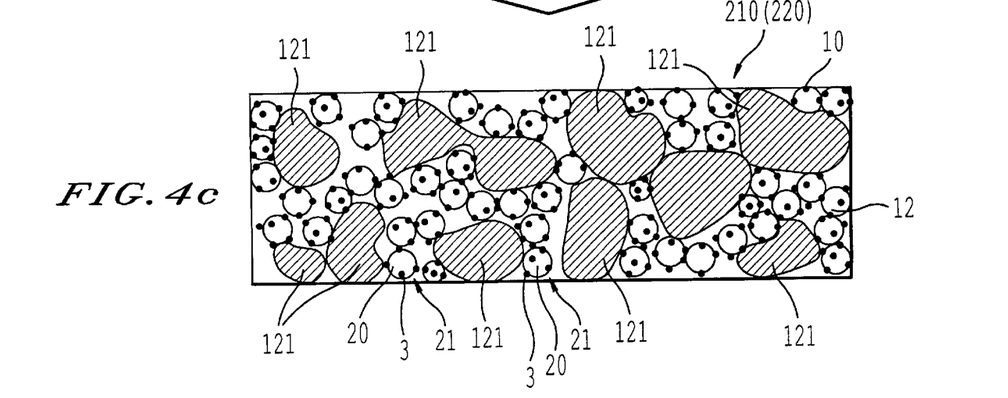

In accordance with a second embodiment of the present invention, FIG. 4 illustrates a gas diffusion layer 210 (220) which is an alternative to the gas diffusion layer 110 (120).

The gas diffusion layer 210 (220) consists of a metallic porous member 12 instead of the carbon paper 11 of the first embodiment.

The gas diffusion porous electrode 210 includes the metallic porous member 12 whose inner structure is interstitial due to internally distributed metallic particles 121. In the metallic porous member 12 there are carbon particles 21 each of which supports a plurality of powdered catalysts 3. Preferably, platinum or a platinum alloy is used as catalyst 3.

There is a plurality of pores or porous inner spaces of different shape in the metallic porous member 12. The pore size is larger then any one of the carbon particles 21 supporting the powdered catalysts 3.

FIG. 4 illustrates also how the gas diffusion layer 210 is formed or made. In step (A) the metallic porous member 12 having the foregoing inner structure is prepared. In the next step (B) a water-repelling treatment is applied to the entire gas diffusion layer 210. In step (C) the carbon particles 21 supporting the catalysts 3 are impregnating in the pores between the metallic particles 121 and 121 so as to be dispersed or distributed along the three dimensions.

The carbon particles 21 supporting the catalyst 3 are dispersed in the gas diffusion layer 210 (220). This makes it possible to integrate the catalyst supporting carbon particles 21 and the gas diffusion layer 210 (220) and have them coexist. This results in improved electrical conductivity, gas permeability, catalyst utilization, and cell characteristics.

In the foregoing structure, the catalyst supporting carbon particles 21 are dispersed in the pores of the metallic porous member 21. Each pore is larger in size than any one of the carbon particle 21. An even or uniform dispersion of the catalysts can be achieved when the foregoing integration of the catalyst supporting carbon particles 21 and the gas diffusion layer 210 (220) is established.

The gas permeability and electrical conductivity are improved. The catalyst supporting carbon particles 21 are dispersed in the metallic porous member 12 in which numerous pores are defined by metallic particles 121.

In addition, the foregoing integration of the catalyst supporting carbon particles 21 and the gas diffusion layer 210 (220) allows to make the gas diffusion electrode thinner, thereby establishing a compact sized fuel cell stack.

The catalysts 3 are dispersed in the gas diffusion layer 210 (220) resulting in less overlay of the catalysts 3 and larger catalyst utilization. Accordingly, the required amount of platinum as a raw material of the catalyst 3 is reduced as compared to the conventional structure for obtaining the same output.

Figure 5A:
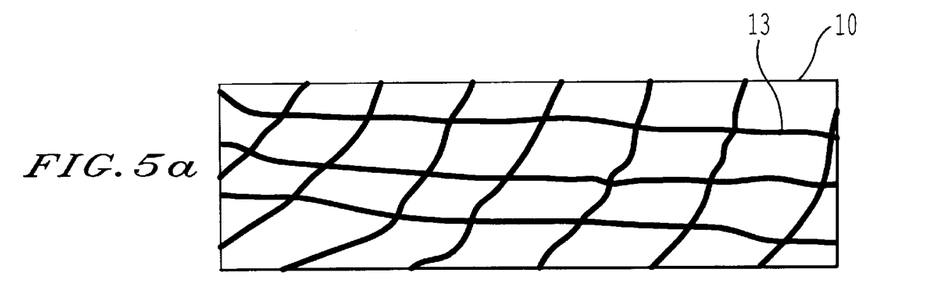
FIG. 5 illustrates, in sequential fashion, how a gas diffusion layer, according to the third embodiment, is made.
Figure 5B:
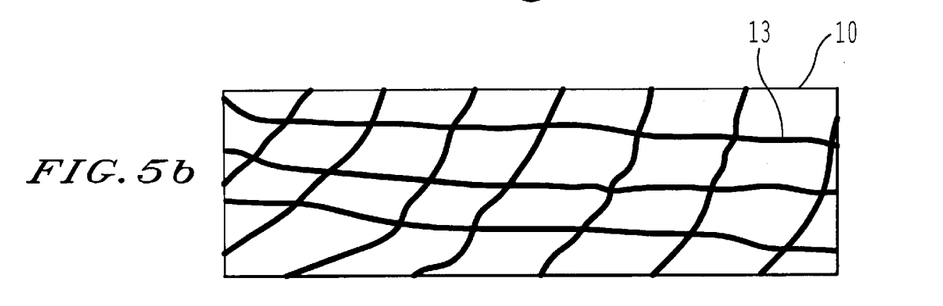
Figure 5C:
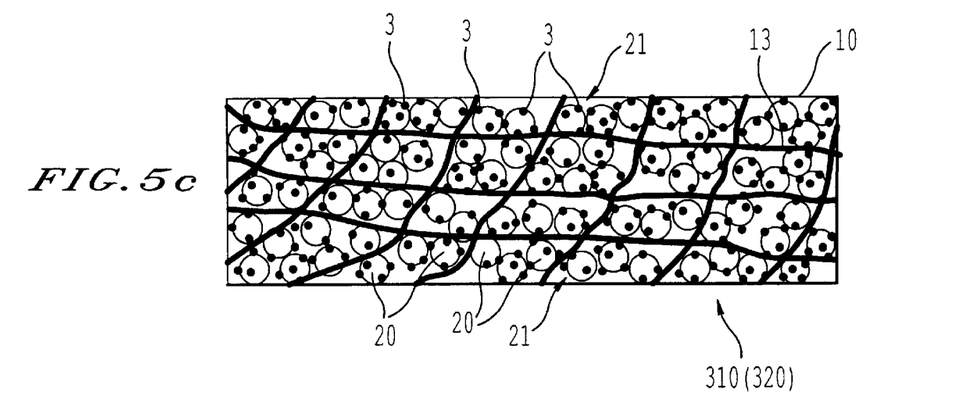

In accordance with a third embodiment of the present invention, in FIG. 5, there is illustrated a gas diffusion layer 310 (320) which is an alternative of the gas diffusion layer 110 (120).

The gas diffusion layer 310 (320) is formed of a carbon cloth 13 instead of the carbon paper 11 of the first embodiment.

The gas diffusion porous electrode 310 includes the carbon cloth 13. The inner structure of the carbon cloth 13 is interstitial having numerous pores. The carbon particles 21 each of which supports a plurality of powdered catalysts 3 are dispersed or distributed in the carbon cloth 13. Preferably platinum or a platinum alloy are used as catalyst 3.

FIG. 5, according to a third embodiment, illustrates also how the gas diffusion layer 310 (320) is formed or made. In step (A), the carbon cloth 13 having the foregoing inner structure is prepared. In step (B), a water-repelling treatment is applied to the entire carbon cloth 13. In step (C), a catalyst paste is infiltrated into the resulting carbon cloth 13 by the Doctor Blade Method to disperse the catalyst paste throughout the carbon cloth 13. The gas diffusion layer 310 including the resultant carbon cloth 13 constitutes an oxidizing electrode.

The above water-repelling treatment proceeds as follows: An undiluted solution of dispersion having a concentration of 60%, provided from DAIKIN KOGYO under the trade name of 'POLYFLOND1grade', is so diluted by water as to establish that the content concentration of tetrafluoroethylene (PTFE) becomes 15% by weight. The carbon cloth 13 in step (A) is immersed in the resulting diluted solution for the impregnation thereof. Next, the resulting cloth 13 is inserted into a drying machine whose inner space is kept at a temperature of 80° C. in order to fully evaporate the water in carbon cloth 13. Thereafter the carbon cloth 13 is retained for being sintered at a temperature of 390° C. for a time duration of 60 minutes. The PTFE sintered carbon cloth 13 in step (B) or the water-repelled carbon cloth 13 is obtained.

The foregoing catalyst paste is made by mixing thoroughly a carbon supporting platinum as a catalyst having a concentration of 40% by weight with ion exchange resin, water, and isopropyl alcohol.

Similarly a fuel electrode is made from the gas diffusion layer 320 including the carbon paper 13 except that instead of the carbon supporting platinum a carbon supporting an alloy of platinum and ruthenium having concentrations of 30% by weight and 15% by weight, respectively, is used.

An ion exchange membrane as the electrolyte membrane is sandwiched between the thus constructed electrodes by hot press.

The resulting assembly constitutes a single type fuel cell.

In FIG. 7, according to a forth embodiment of the present invention, there is illustrated a gas diffusion layer 410 (420) which is similar to the gas diffusion layer 310 (320) shown in FIG. 5 except that the former is rougher than the latter with regard to the mesh of the carbon cloth.

The gas diffusion layer 410 (420) is made as follows: The carbon cloth 13 whose mesh is rougher than that shown in FIG. 5 is prepared in step (A). In step (B), a carbon black paste is implemented into the carbon cloth 13 by screen printing. The carbon black paste is obtained by stirring a mixture of a carbon black and a forming auxiliary such as ethyleneglycol. The carbon black paste implemented carbon cloth 13 is dried. Thereafter, in step (C), a water-repelling treatment is applied.

In detail, the carbon black paste implemented carbon cloth 13 is, similar to the first embodiment, immersed in a dispersion solution. The carbon cloth 13 taken out from the dispersion solution is then inserted into a vacuum drying machine, to be dried for 2 hours. The vacuum drying machine is kept at a temperature of 80° C. After evaporation of the solution, the carbon cloth 13 is retained for being sintered or water-repelled carbon cloth 13 is obtained at step (C).

A catalyst paste is prepared which is similar to the one used in the third embodiment. Such a catalyst paste is incorporated into the PTFE sintered or water-repelled carbon cloth 13 at step (D). The resultant carbon cloth 13 constitutes the gas diffusion layer 410, which is used as an oxidant electrode.

Similarly, a fuel electrode is made from the gas diffusion layer 420 which includes the same carbon cloth 13.

An ion exchange membrane as the electrolyte membrane is sandwiched between the thus constructed electrodes by hot press.

The resultant assembly constitutes a single type fuel cell.

Having generally described this invention, a further understanding can be obtained by reference to certain specific examples which are provided herein for purposes of illustration only, and are not intended to be limiting unless otherwise specified.

EXAMPLES

Example 1

In accordance with the third embodiment of the invention and the procedure illustrated in FIG. 5, a carbon cloth 13 was prepared that undergoes water-repelling treatments described above. A catalyst paste and fuel electrodes were prepared according to the above procedures. An ion exchange membrane was sandwiched between the above electrodes by hot press. The resultant assembly constituted a single type fuel cell.

An experiment was carried out for generating electricity using this fuel cell as a first example in such a manner that the Cell Temperature is set to be 80° C. Air with a utilization of 40% is supplied to the oxidizing electrode at 2.5 atmospheric pressures, and hydrogen with a utilization of 80% is supplied to the fuel electrode at 2.5 atmospheric pressures. As a result, a cell potential is obtained shown by a dotted-line graph in FIG. 6.

Example 2

In accordance with the forth embodiment of the invention and the procedure illustrated in FIG. 7 and described above a carbon black past impregnated carbon cloth 13, a catalyst paste and fuel electrodes were prepared. An ion exchange membrane was sandwiched between the above electrodes by hot press. The resultant assembly constituted a single type fuel cell.

An experiment was carried out for generating electricity using this fuel cell as a second example in such a manner that the Cell Temperature is set to be 80° C. Air with a utilization of 40% is supplied to the oxidizing electrode at 2.5 atmospheric pressures, and hydrogen with a utilization of 80% is supplied to the fuel electrode at 2.5 atmospheric pressures. As a result, a cell potential is obtained shown by a one-dot-chained-line graph in FIG. 6.

Comparative Example 1

A carbon paper provided from Toray Corporation (Trade Name: Torayca TGP-060 180 $\mu$m) was immersed in a dispersion solution like that in the first embodiment. The removed carbon paper was dried for evaporating excess water by inserting in a drying machine that was kept at a temperature of 80° C. (PTFE sintering). Thereafter, the resultant carbon paper was sintered for a time duration of 60 minutes at a temperature of 80° C.

Next, a catalyst paste was made by mixing ion exchange resin solution, water, organic solvent such as isopropylalcohol as a forming auxiliary, and carbon supporting a platinum having a concentration of 40% by weight. A catalyst thin film layer having a thickness of 300 $\mu$m was made on the PTFE-sintered or water-repelled carbon paper. The resultant carbon paper was used as an oxidant electrode. Similarly, a fuel electrode was made.

An ion exchange membrane as the electrolyte membrane was brought into a sandwiched connection between the thus constructed electrodes by hot press.

The resultant assembly constituted a single type fuel cell.

An experiment was carried out for generating electricity using this fuel cell in such a manner that the Cell Temperature was set to be 80° C. Air with a utilization of 40% was supplied to the oxidizing electrode at 2.5 atmospheric pressures, and hydrogen with a utilization of 80% was supplied to the fuel electrode at 2.5 atmospheric pressures. As a result, a cell potential was obtained shown as a solid-line graph in FIG. 6.

Figure 6:
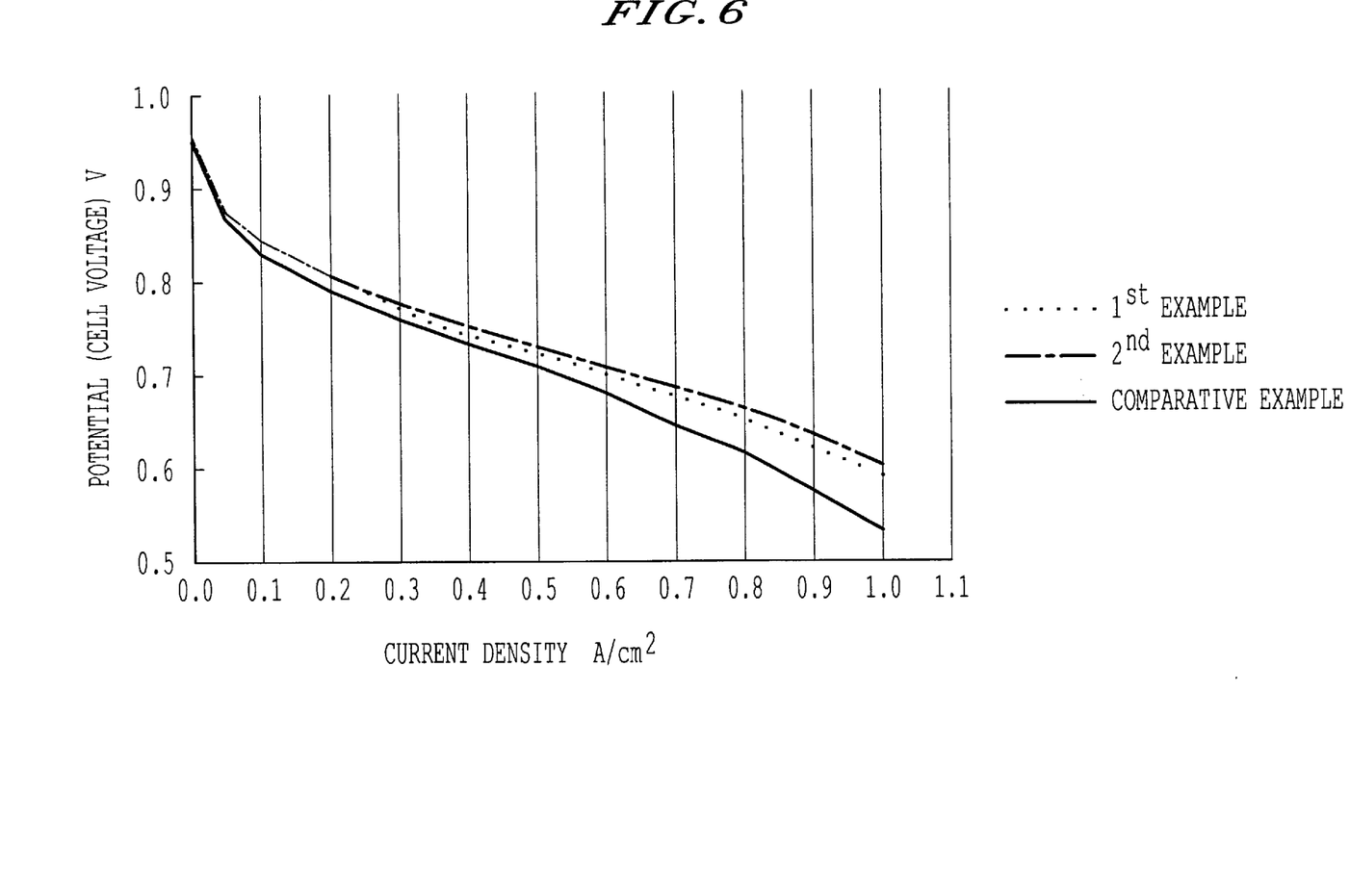
FIG. 6 illustrates a graph of cell potential versus current density, comparing fuel cells according to the present invention with a prior art device.
Figure 7A:
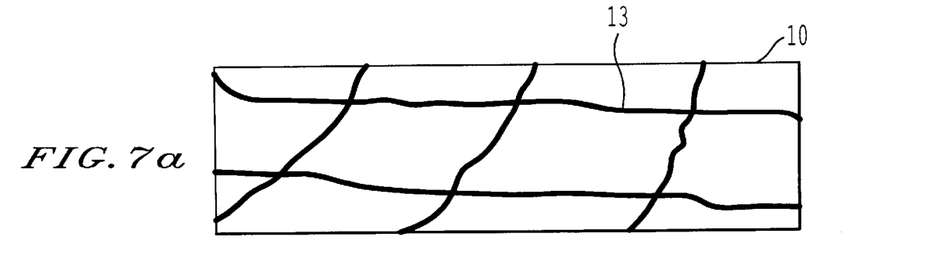
FIG. 7 illustrates, in sequential fashion, how a gas diffusion layer, according to the forth embodiment, is made.
Figure 7B:
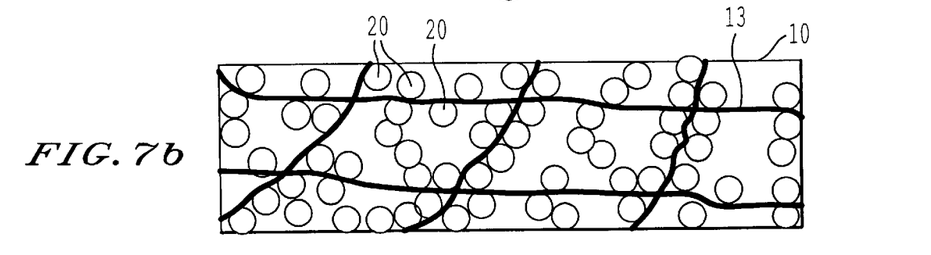
Figure 7C:
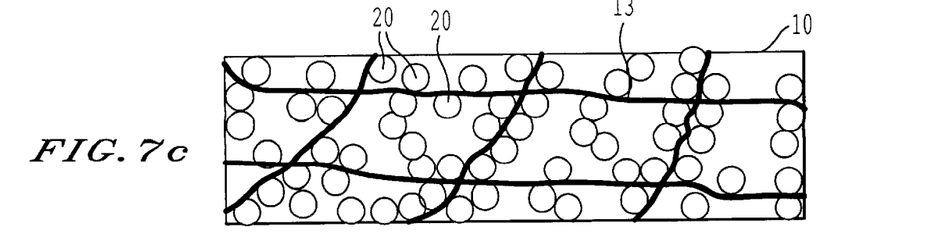
Figure 7D:
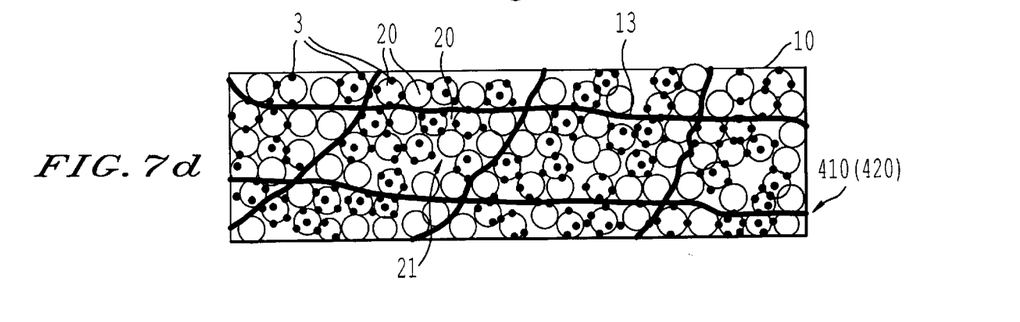

As apparent from the results of the first Example, the second Example, and the Comparative Example which are represented in graphically in FIG. 6, the first Example and the second Example are superior to the Comparative Example in Cell Output characteristics.

The priority document of the present application, Japanese patent application 11(1999)-218048, filed Jul. 30, 1999, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A solid polymer electrolyte fuel cell, comprising:
   a first gas diffusion layer;
   a second gas diffusion layer; and
   an electrolyte;
   wherein said first gas diffusion layer is arranged on one side of said electrolyte;
   wherein said second gas diffusion layer is arranged on the other side of said electrolyte;

wherein said electrolyte is an ion exchange membrane; and wherein an electrode catalyst is dispersed in at least one of said first gas diffusion layer and said second gas diffusion layer.

2. The solid polymer electrolyte fuel cell according to claim 1, wherein said electrode catalyst is supported on a supporting member.

3. The solid polymer electrolyte fuel cell according to claim 2, wherein at least one of said first gas diffusion layer and said second gas diffusion layer has at least one pore;

wherein said pore is larger than said supporting member; and wherein each of said first gas diffusion layer and said second gas diffusion layer is a cellular dispersion layer;

wherein said supporting member is dispersed.

4. The solid polymer electrolyte fuel cell according to claim 3, wherein said supporting member is an electrically conducting particle.

5. The solid polymer electrolyte fuel cell according to claim 4, wherein said electrically conducting particle is a carbon particle or a metallic particle.

6. The solid polymer electrolyte fuel cell according to claim 5, wherein said cellular dispersion layer is formed of a carbon fiber material selected from the group consisting of a carbon paper and a carbon cloth.

7. The solid polymer electrolyte fuel cell according to claim 5, wherein said cellular dispersion layer is formed of a carbon particle sintered member or a metal-made member.

8. A solid polymer electrolyte fuel cell, comprising:

an electrolyte;

a gas diffusion layer arranged on each side of said electrolyte; and an electrode catalyst dispersed in said gas diffusion layer, wherein said electrolyte is an ion exchange membrane.

9. The solid polymer electrolyte fuel cell according to claim 8, wherein said electrode catalyst is a powder consisting of at least one particle, wherein at least one particle is supported on at least one supporting member, wherein said supporting member is distributed throughout said gas diffusion layer.

10. The solid polymer electrolyte fuel cell according to claim 9, wherein said gas diffusion layer has at least one pore;

wherein said pore is greater in size than said supporting member, and wherein a dispersion of said electrode catalyst is established by filling at least one supporting member in said pore.

11. The solid polymer electrolyte fuel cell according to claim 10, wherein said supporting member is an electrically conducting particle.

12. The solid polymer electrolyte fuel cell according to claim 11, wherein said electrically conducting particle is a carbon particle or a metallic particle.

13. The solid polymer electrolyte fuel cell according to claim 12, wherein said gas diffusion layer is formed of a carbon fiber material selected from the group consisting of a carbon paper and a carbon cloth.

14. The solid polymer electrolyte fuel cell according to claim 12, wherein said gas diffusion layer is formed of a carbon particle sintered member or a metal-made member.

* * * * *